(12) United States Patent
Lee et al.

(10) Patent No.: US 8,053,070 B2
(45) Date of Patent: Nov. 8, 2011

(54) OPTICAL FILM HAVING GRADED REFRACTIVE INDEX AND METHOD OF MANUFACTURING THE SAME

(75) Inventors: Eun Kyung Lee, Suwon-si (KR); Jae Ho You, Hwaseong-si (KR); Byoung Lyong Choi, Seoul (KR); Seung Ho Nam, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 706 days.

(21) Appl. No.: 12/042,843

(22) Filed: Mar. 5, 2008

(65) Prior Publication Data

US 2009/0081429 A1     Mar. 26, 2009

(30) Foreign Application Priority Data

Sep. 20, 2007 (KR) .................. 10-2007-0096055

(51) Int. Cl.
*B32B 5/32* (2006.01)
(52) U.S. Cl. .................. 428/310.5; 428/212; 428/315.5; 428/312.6; 428/312.8; 428/320.2; 428/315.9; 428/701; 428/702; 428/913
(58) Field of Classification Search ............... None
See application file for complete search history.

(56) References Cited

U.S. PATENT DOCUMENTS

| | | |
|---|---|---|
| 2,882,243 A | 4/1959 | Milton |
| 2,882,244 A | 4/1959 | Milton |
| 3,130,007 A | 4/1964 | Breck |
| 3,247,195 A | 4/1966 | Kerr |
| 3,308,069 A | 3/1967 | Wadlinger et al. |
| 3,314,752 A | 4/1967 | Kerr |
| 3,702,886 A | 11/1972 | Argauer et al. |
| 3,709,979 A | 1/1973 | Chu |
| 3,832,449 A | 8/1974 | Rosinski et al. |
| 3,948,758 A | 4/1976 | Bonacci et al. |
| 3,972,983 A | 8/1976 | Ciric |
| 4,016,245 A | 4/1977 | Plank et al. |
| 4,076,842 A | 2/1978 | Plank et al. |
| 4,086,186 A | 4/1978 | Rubin et al. |
| 4,229,424 A | 10/1980 | Kokotailo |

(Continued)

FOREIGN PATENT DOCUMENTS

EP         229295         7/1987

(Continued)

OTHER PUBLICATIONS

A. G. Dirks, et al., Columnar Microstructure in Vapor-Deposited Thin Films, Thin Solid Films 47 (1977), pp. 219-233.

(Continued)

*Primary Examiner* — Ling Xu
(74) *Attorney, Agent, or Firm* — Cantor Colburn LLP

(57) ABSTRACT

Disclosed are an optical film having a graded refractive index and a method of manufacturing the same. The optical film includes one or more antireflection films composed of a mesoporous material having a plurality of pores of a uniform size, and the pores of the mesoporous material are filled with air or a filler having a refractive index different from that of the mesoporous material, and thus the volume ratio of mesoporous material to filler in the pores thereof is controlled, thereby obtaining a desired magnitude of effective refractive index and ensuring a refractive index distribution in which the refractive indexes sequentially change, resulting in high antireflection performance. The method of manufacturing the optical film may be conducted using a nanowire growing technique, thus making it easy to realize mass production.

9 Claims, 12 Drawing Sheets

U.S. PATENT DOCUMENTS

| | | | |
|---|---|---|---|
| 4,254,297 | A | 3/1981 | Frenken et al. |
| 4,310,440 | A | 1/1982 | Wilson et al. |
| 4,397,827 | A | 8/1983 | Chu |
| 4,440,871 | A | 4/1984 | Lok et al. |
| 4,500,651 | A | 2/1985 | Lok et al. |
| 4,619,818 | A | 10/1986 | Derouane et al. |
| 4,623,527 | A | 11/1986 | Derouane et al. |
| 4,632,811 | A | 12/1986 | Derouane et al. |
| 4,639,357 | A | 1/1987 | Derouane et al. |
| 4,639,358 | A | 1/1987 | Derouane et al. |
| 4,664,897 | A | 5/1987 | Derouane et al. |
| 4,673,559 | A | 6/1987 | Derouane et al. |
| 4,698,217 | A | 10/1987 | Valyocsik |
| 4,797,267 | A | 1/1989 | Kuehl et al. |
| 4,880,611 | A | 11/1989 | von Ballmoos et al. |
| 4,954,325 | A | 9/1990 | Rubin et al. |
| 5,098,684 | A | 3/1992 | Kresge et al. |
| 5,102,643 | A | 4/1992 | Kresge et al. |
| 5,198,203 | A | 3/1993 | Kresge et al. |
| 5,236,575 | A | 8/1993 | Bennett et al. |
| 5,278,345 | A | 1/1994 | Janssen et al. |
| 5,336,478 | A | 8/1994 | Dwyer et al. |
| 5,362,697 | A | 11/1994 | Fung et al. |
| 5,783,321 | A | 7/1998 | Verdujin et al. |
| 6,287,645 | B1 * | 9/2001 | Balkus et al. ............ 427/597 |
| 6,592,764 | B1 * | 7/2003 | Stucky et al. ............ 210/660 |
| 2002/0109134 | A1 * | 8/2002 | Iwasaki et al. ............ 257/13 |
| 2004/0084080 | A1 * | 5/2004 | Sager et al. ............ 136/263 |
| 2006/0138394 | A1 * | 6/2006 | Den et al. ............ 257/3 |
| 2008/0079894 | A1 * | 4/2008 | Matheron et al. ............ 351/159 |

FOREIGN PATENT DOCUMENTS

FR      2874007     *    2/2006

OTHER PUBLICATIONS

M. Harris, et al., The Relationship between Optical Inhomogeneity and Film Structure, Thin Solid Films, 57 (1979), pp. 173-178.

Yang Zhao, et al., Colloidal Subwavelength Nanostructures for Antireflection Optical Coatings, Optics Letters, Jul. 15, 2005, vol. 30, No. 14, pp. 1885-1887.

* cited by examiner

— Case 1
—·— Case 2
—··— Case 3
------ Case 4

— Case 1
—·— Case 2
—··— Case 3
------ Case 4

(2D-distribution)

(3D-distribution)

100nm

10nm

OPTICAL FILM HAVING GRADED REFRACTIVE INDEX AND METHOD OF MANUFACTURING THE SAME

PRIORITY STATEMENT

This non-provisional application claims priority under U.S.C. §119 from Korean Patent Application No. 10-2007-0096055, filed on Sep. 20, 2007 with the Korean Intellectual Property Office (KIPO), the entire contents of which are herein incorporated by reference.

BACKGROUND

1. Field

Example embodiments relate to an optical film having a graded refractive index and a method of manufacturing the same, and more particularly, to an optical film having a graded refractive index, including one or more antireflection films composed of a mesoporous material having a plurality of pores of a uniform size, in which the pores of the mesoporous material are filled with air or a filler having a refractive index different from that of the mesoporous material, and thus the volume ratio of mesoporous material to filler in the pores thereof is controlled, thereby obtaining a desired magnitude of effective refractive index and ensuring a refractive index distribution in which the refractive indexes sequentially change, resulting in high antireflection performance, and to a method of manufacturing the same.

2. Description of the Related Art

An antireflection film means a film for preventing the reflection of light. For example, an antireflection film useful in the visible light range may be applied to various display devices including plasma display panels (PDPs) in a manner such that it is spaced by a predetermined interval apart from the surface of the display device to improve contrast and image quality, and may constitute an optical filter along with a selective light absorbing layer for improving a color tone and an electromagnetic wave blocking layer for blocking electromagnetic waves. In addition, an antireflection film that is useful in the near infrared light range may be widely applied to various fields including optical communication and optoelectronic devices.

However, conventional antireflection film coating techniques are problematic in that the refractive index is drastically changed at the interface of an optical device, undesirably increasing reflected light. Thus, as attempts to solve the problem in which the efficiency of the optical device is drastically decreased, there has been proposed the formation of a monolayer film which satisfies the relation of sqrt (n1*n2) (n1: refractive index of material, n2: refractive index of air) as thick as ¼ of the incident wavelength in the case where light is incident perpendicular to the interface of the optical device. However, in the case where light is incident on the optical device under conditions in which the incident wavelength is not a short wavelength but is a long wavelength or the incident angle is not a right angle but is an obtuse angle, antireflection performance is remarkably decreased.

Moreover, the efficiency of the device is intended to be improved by providing the antireflection film in the form of a multilayer of three layers or more, instead of a monolayer form. In this case, however, expensive equipment for precisely controlling the thickness of each layer and vacuum equipment are required, making it difficult to realize mass production.

SUMMARY

Accordingly, example embodiments have been devised keeping in mind the above problems occurring in the related art, and provided is an optical film having high antireflection performance, in which the pores of a mesoporous material having a plurality of pores of a uniform size are filled with air or a filler having a refractive index different from that of the mesoporous material.

Example embodiments provide a method of manufacturing an optical film having high antireflection performance, by providing a mesoporous material having a plurality of pores of a uniform size, filling the pores of the mesoporous material with air or a filler having a refractive index different from that of the mesoporous material, and then subjecting such a mesoporous material to thin film treatment, thus realizing a desired magnitude of effective refractive index.

Example embodiments provide an electronic device including the optical film.

According to the example embodiments, an optical film may include one or more antireflection films composed of a mesoporous material having a plurality of pores of a uniform size, the pores of the mesoporous material being filled with air or a filler having a refractive index different from that of the mesoporous material.

According to the example embodiments, a method of manufacturing an optical film may include (a) providing a mesoporous material having a plurality of pores of a uniform size and (b) subjecting the mesoporous material to thin film treatment, thus forming a monolayered antireflection film.

According to the example embodiments, an electronic device may include the above optical film.

BRIEF DESCRIPTION OF THE DRAWINGS

Example embodiments will be more clearly understood from the following detailed description, taken in conjunction with the accompanying drawings. FIGS. 1-16 depict non-limiting example embodiments described herein.

FIG. 1 is a graph illustrating the change in the refractive index of the mesoporous material depending on the volume ratio of air to SiOx;

FIG. 2 is a graph illustrating the change in the refractive index of the mesoporous material depending on the volume ratio of $SiO_x$ to Si when the pores of the mesoporous material are filled with a filler having a refractive index different from that of the mesoporous material;

FIG. 3 is a schematic view illustrating the optical film including three antireflection films which are sequentially stacked, according to the example embodiments;

FIG. 4 is a schematic view illustrating the optical film including three antireflection films which are sequentially stacked, according to the example embodiments;

FIG. 8 is a schematic view illustrating the process of synthesizing the mesoporous material, according to the example embodiments;

FIG. 9 is a schematic view illustrating the process of growing nanowires as a filler in the pores of the mesoporous material, according to the example embodiments;

FIG. 10 is a schematic view illustrating the process of growing nanowires as a filler in the pores of the mesoporous material, according to the example embodiments;

FIG. 11 is a schematic view illustrating the process of growing the nanowires using a vapor-liquid-solid (VLS) mechanism;

FIG. 12 is a schematic view illustrating the three-dimensional distribution of the mesoporous material, according to the example embodiments;

FIG. 15 is a TEM image of the mesoporous material, in which silicon nanowires are formed in the pores thereof, according to the example embodiments; and FIG. 16 is an XRD graph of the mesoporous material, in which silicon nanowires are formed in the pores thereof, according to the example embodiments.

DESCRIPTION OF THE PREFERRED EMBODIMENTS

Hereinafter, a detailed description will be given of the example embodiments with reference to the appended drawings.

According to the example embodiments, an optical film includes one or more antireflection films composed of a mesoporous material having a plurality of pores of a uniform size, and the pores of the mesoporous material are filled with air or a filler having a refractive index different from that of the mesoporous material.

The effective refractive index of the optical film may be controlled by adjusting the porosity of the mesoporous material. Specifically, when the porosity of the mesoporous material is adjusted, the volume ratio of mesoporous material to air or filler, having a refractive index different from that of the mesoporous material, in the pores thereof may be controlled. The volume ratio thus controlled affects the effective refractive index of the mesoporous material.

Table 1 below shows Vt (total pore volume: cm³/g) and porosity of the mesoporous material, for example, SBA-15 and SBA-16. The method of adjusting the porosity of the mesoporous material is based on a known technique.

TABLE 1

|  | Vt | Porosity |  | Vt | Porosity |
|---|---|---|---|---|---|
| SBA-16 | 0.21 | 0.316006 | SBA-15 | 0.42 | 0.48025 |
|  | 0.34 | 0.427918 |  | 0.44 | 0.49187 |
|  | 0.36 | 0.441965 |  | 0.62 | 0.576988 |
|  | 0.47 | 0.508358 |  | 0.81 | 0.640547 |
|  | 0.51 | 0.528747 |  | 0.82 | 0.643367 |
|  | 0.53 | 0.53832 |  | 0.87 | 0.656829 |
|  | 0.56 | 0.551972 |  | 0.88 | 0.659401 |
|  | 0.63 | 0.580889 |  | 0.96 | 0.678663 |
|  | 0.67 | 0.595797 |  | 1.02 | 0.691739 |
|  | 0.72 | 0.613003 |  | 1.08 | 0.703792 |

As is apparent from Table 1, the case where the porosity of SBA-16 is 0.316006 means that about 31% of the total volume of the mesoporous material is filled with air.

Figure 1:
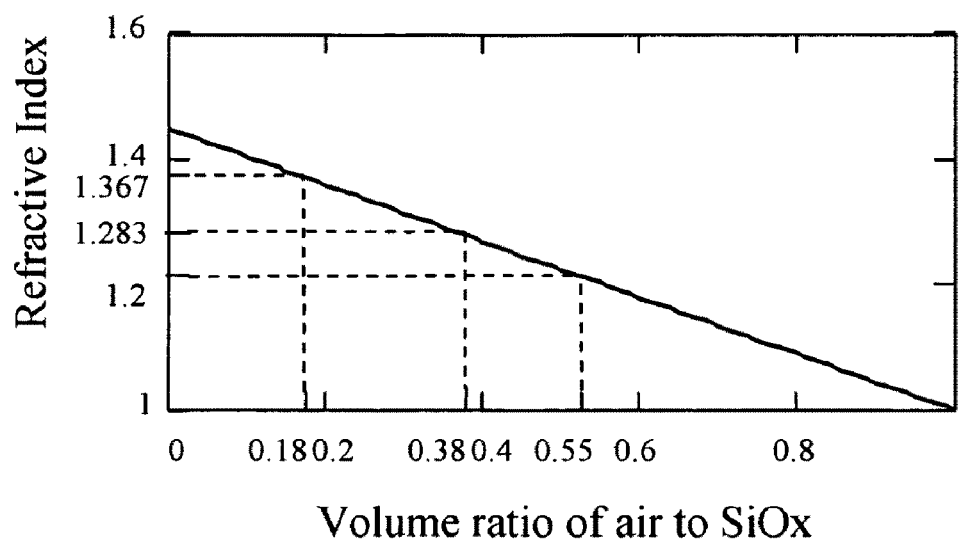

FIG. 1 is a graph illustrating the change in the refractive index of the mesoporous material depending on the volume ratio of air to SiOx. In FIG. 1, the volume ratio of air to SiOx is shown as a transverse axis, and the change in the refractive index depending thereon is shown as a longitudinal axis. As seen in this drawing, when the volume ratio of air to SiOx, in which the refractive index of air is 1 and the refractive index of $SiO_x$ is about 1.45, is 0.18, the refractive index of the mesoporous material is 1.367, from which the refractive index of the mesoporous material can be seen to decrease linearly in inverse proportion to the increase in the volume ratio of air to SiOx. Specifically, the porosity of the mesoporous material is adjusted, whereby the volume ratio of mesoporous material to air loaded in the pores of the mesoporous material is controlled, which thus enables the refractive index of the mesoporous material to be controlled.

Also, the pores of the mesoporous material may be filled with a filler having a refractive index different from that of the mesoporous material. As the volume ratio of mesoporous material to filler loaded in the pores thereof is controlled, the desired magnitude of refractive index may be obtained.

When the pore size of the mesoporous material is increased to thus increase the porosity, the packing density of the pores may be increased, and as well, the refractive index of the total material becomes similar to the refractive index of the internal filler. Conversely, when the porosity is decreased to thus decrease the proportion of the internal filler, the resultant refractive index becomes similar to the refractive index of the mesoporous material. In this way, when the porosity is changed, a thin film composed of the synthesized mesoporous material and the filler may have a graded refractive index, and thus may be used as a non-reflective coating material which ensures a viewing angle in a wide wavelength range.

Figure 2:
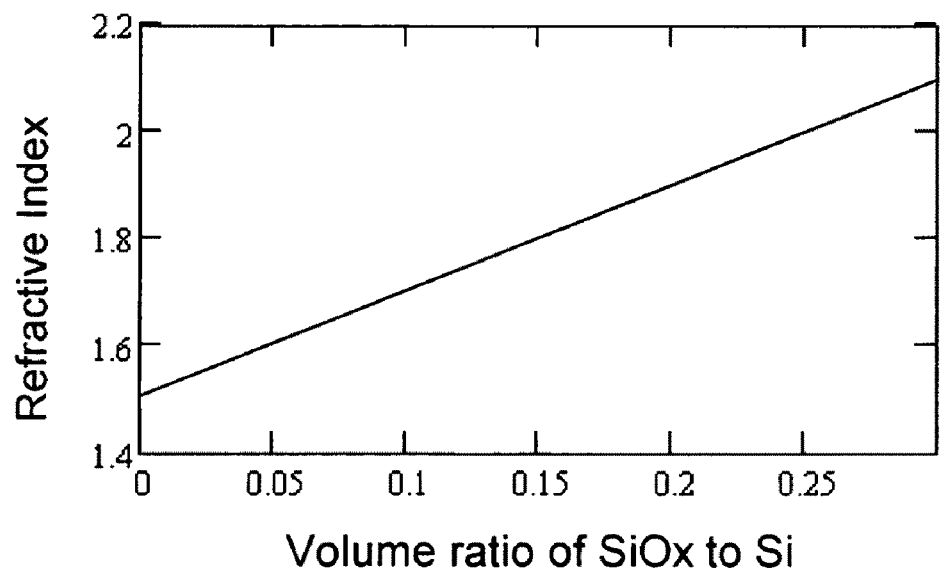

FIG. 2 is a graph illustrating the change in the refractive index of the mesoporous material depending on the volume ratio of $SiO_x$ to Si in the case where the pores of the mesoporous material are filled with a filler having a refractive index different from that of the mesoporous material. In FIG. 2, the volume ratio of $SiO_x$ to Si is shown as a transverse axis, and the change in the refractive index depending thereon is shown as a longitudinal axis. As seen in this drawing, the refractive index of the mesoporous material is increased linearly in proportion to the increase in the volume ratio of $SiO_x$ to Si, in which the refractive index of $SiO_x$ is about 1.45 and the refractive index of Si is about 3.5.

The optical film according to the example embodiments includes two or more antireflection films which are sequentially stacked, the antireflection films having refractive indexes that sequentially change. Specifically, in the case where the optical film includes two or more antireflection films which are sequentially stacked, it has a refractive index distribution in which the refractive indexes sequentially change at the interface of a device. Thereby, the optical film may ensure predetermined antireflection performance even under conditions in which the ranges of incident wavelengths and incident angles are broad.

Figure 3:
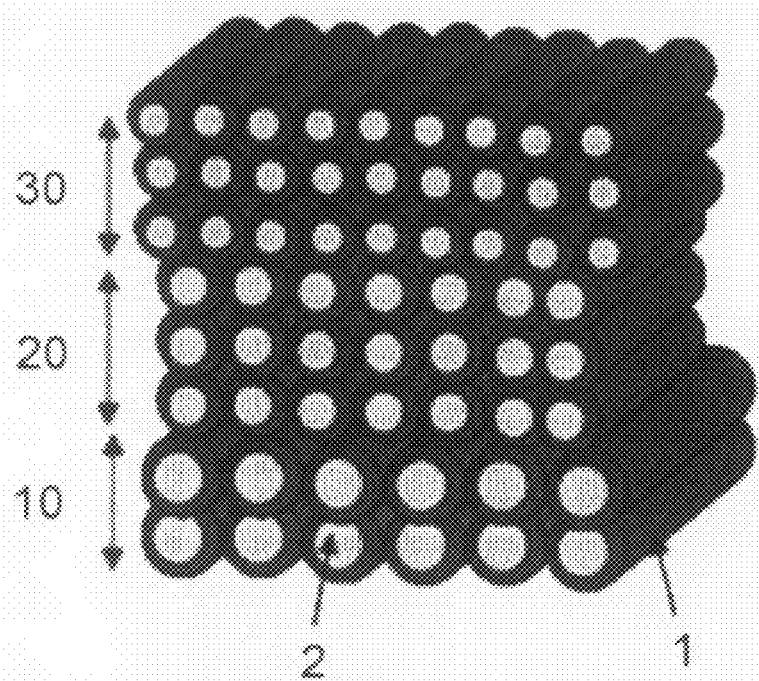

FIG. 3 is a schematic view illustrating the optical film including three antireflection films which are sequentially stacked, according to the example embodiments. As seen in this drawing, the optical film has a structure in which an antireflection film 20 having a refractive index of n2 and an antireflection film 30 having a refractive index of n3 are sequentially stacked on an antireflection film 10 having a refractive index of n1 by filling the pores of the mesoporous material 1 with the filler 2. As such, each of the antireflection films may have a desired magnitude of refractive index through the control of the volume ratio of mesoporous material to air or filler in the pores of the mesoporous material. In the optical film, the refractive indexes of the antireflection films are sequentially decreased (e.g., n1>n2>n3), and thereby the optical film may exhibit high antireflection performance.

Figure 4:
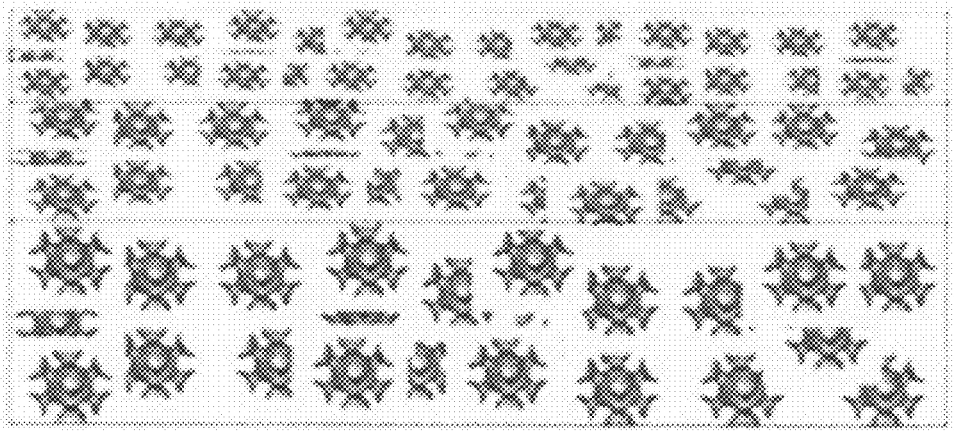

FIG. 4 is a schematic view illustrating the optical film including three antireflection films which are sequentially stacked, according to the example embodiments. As such, in the optical film, which is formed using a cubic mesoporous material, the refractive indexes of antireflection films can be seen to be sequentially decreased.

The optical film according to the example embodiments has a reflectance ranging from 0.01% to 1% in the visible light range.

This is advantageous because, in various display devices including PDPs, low reflectance in the visible light range results in high device performance.

Figure 5A:
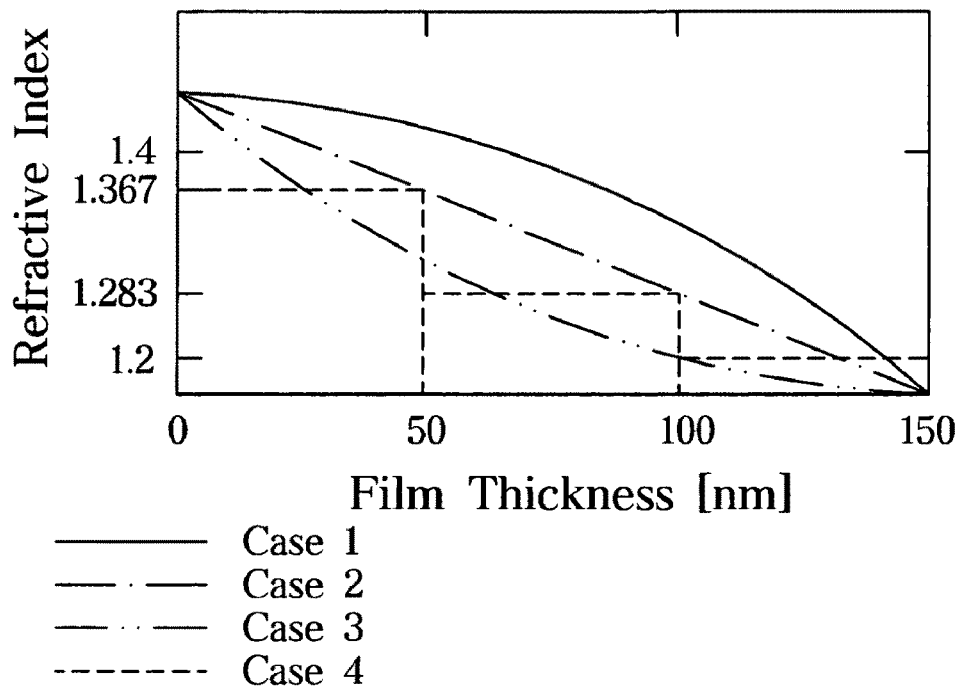
FIG. 5A is a graph illustrating the change in the refractive index depending on the thickness of the film.
Figure 5B:
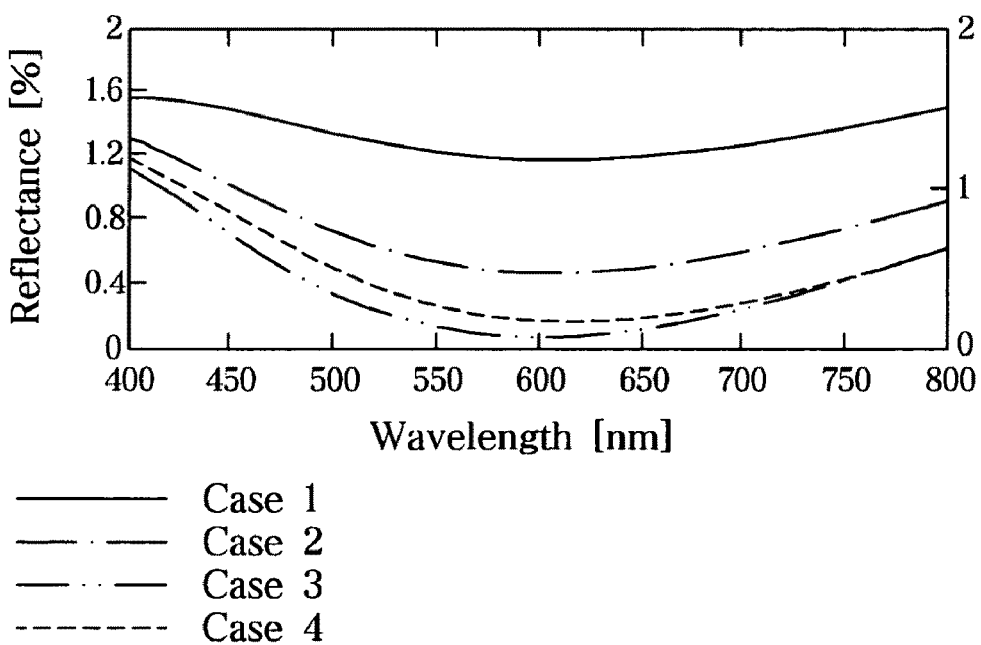
FIG. 5B is a graph illustrating the change in the reflectance depending on the wavelength.

FIG. 5A is a graph illustrating the change in the refractive index depending on the thickness of the film, and FIG. 5B is a graph illustrating the change in the reflectance depending on the wavelength. In FIG. 5A, the cases 1, 2, 3 show the change in the refractive index of a film having an ideal graded refractive index. FIG. 5B shows the reflectance (%) of the film measured at different wavelengths. The case 4 of FIG. 5A shows the refractive index when three layers having different refractive indexes (e.g., 1.367, 1.283, 1.2) are stacked, and the case 4 of FIG. 5B shows the reflectance (%) of the above film measured at different wavelengths.

The case where only the three layers having different refractive indexes are stacked shows a change in reflectance similar to the case 3 exhibiting the lowest reflectance among the cases 1, 2, 3 having ideal graded refractive indexes.

Figure 6A:
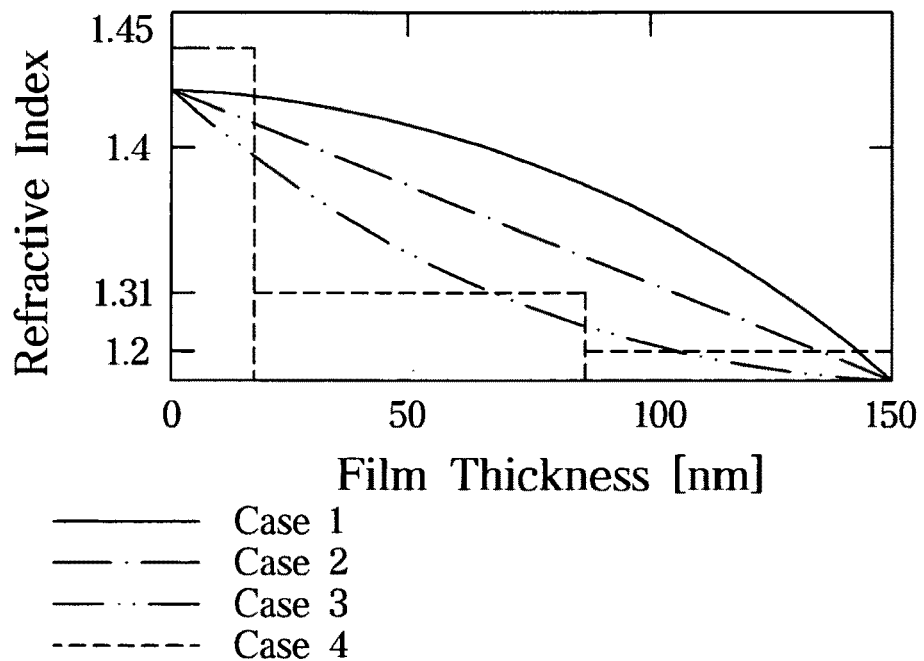
FIG. 6A is a graph illustrating the change in the refractive index depending on the thickness of the film.
Figure 6B:
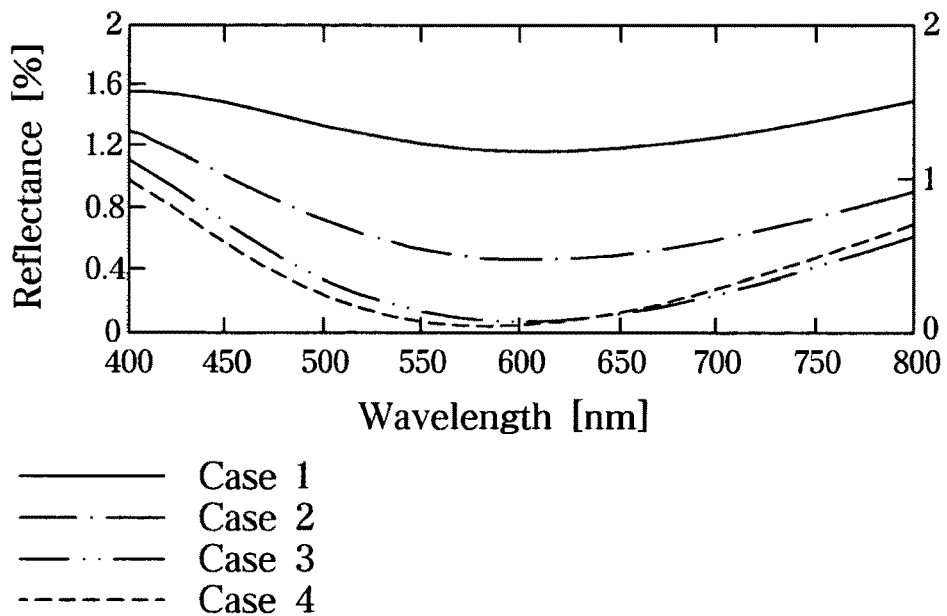
FIG. 6B is a graph illustrating the change in the reflectance depending on the wavelength.

Further, when a film, which is formed using three layers having different refractive indexes (case 4), has different layer thicknesses, the change in the reflectance (%) at different wavelengths is measured. The results thereof are shown in FIGS. 6A and 6B. Specifically, FIG. 6A is a graph illustrating the change in the refractive index depending on the thickness of the film, and FIG. 6B is a graph illustrating the change in the reflectance depending on the wavelength. As such, the cases 1, 2, 3 (FIG. 6A) show the change in the refractive index of a film having an ideal graded refractive index. The change in the reflectance (%) of the film at different wavelengths is shown in FIG. 6B. The case 4 of FIG. 6A shows the refractive index when three layers having different refractive indexes (e.g., 1.45, 1.31, 1.2) are stacked to different thicknesses, and the case 4 of FIG. 6B shows the reflectance (%) of the above film measured at different wavelengths.

The case where only the three layers having different refractive indexes are stacked shows a change in reflectance lower than the case 3 exhibiting the lowest reflectance among the cases 1, 2, 3 having ideal graded refractive indexes. In particular, low reflectance can be seen to be realized in the visible light range. Also, even if the thickness of each layer is not particularly limited, high antireflection performance may be exhibited.

Figure 7A:
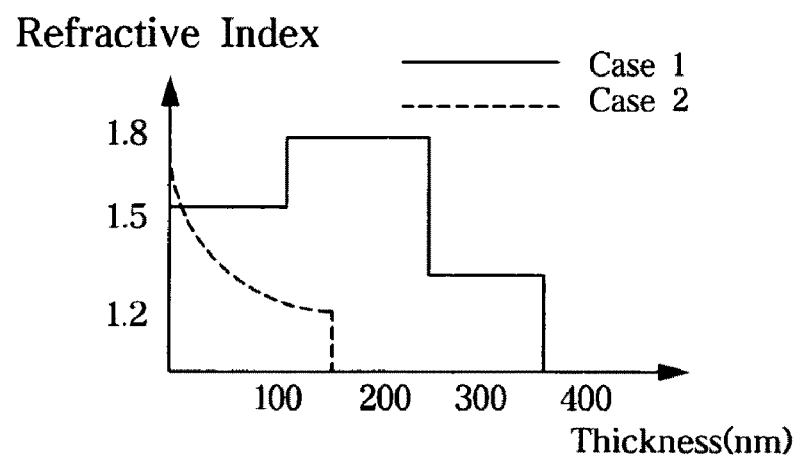
FIG. 7A is a graph illustrating the change in the refractive index depending on the thickness of the film.
Figure 7B:
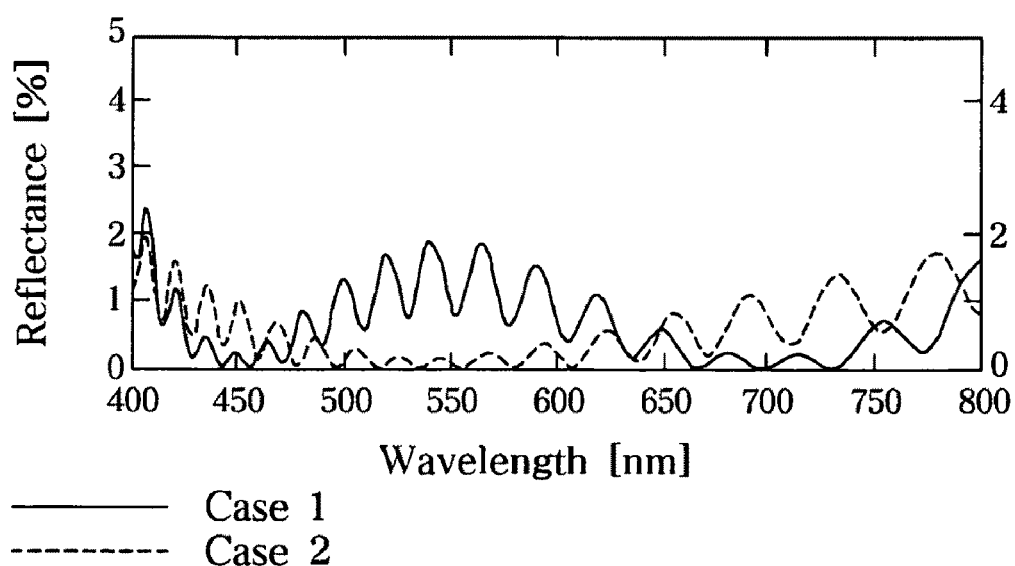
FIG. 7B is a graph illustrating the change in the reflectance depending on the wavelength.

FIG. 7A is a graph illustrating the change in the refractive index depending on the thickness of the film, and FIG. 7B is a graph illustrating the change in the reflectance depending on the wavelength. In FIG. 7A, the case 1 shows the change in the refractive index when a film is formed by stacking three layers having different refractive indexes using a natural material, and the reflectance (%) of the above film measured at different wavelengths is shown in FIG. 7B. In FIG. 7A, the case 2 shows a graded refractive index distribution when measuring the effective refractive index of an optical film formed by stacking three layers having different refractive indexes using a mesoporous material. The case 2 of FIG. 7B shows the reflectance (%) of the above optical film measured at different wavelengths.

With reference to these drawings, in the case (case 1) where the film is formed by stacking three layers having different refractive indexes using a natural material, the film is thick and has a high reflectance in the visible light range. Conversely, in the case (case 2) where the optical film is formed by stacking three layers having different refractive indexes using a mesoporous material, the film is relatively thin and has low reflectance in the visible light range, thereby exhibiting higher antireflection performance.

As mentioned above, although the film may be obtained by stacking the layers having difference refractive indexes using a natural material, it is difficult to attain a desired magnitude of effective refractive index and to form a thin film. In contrast, the optical film using the mesoporous material according to the example embodiments may have a desired magnitude of effective refractive index through adjustment of the porosity of the mesoporous material and control of the volume ratio of mesoporous material to filler, advantageously exhibiting high antireflection performance.

The effective refractive index of the thin film having different refractive indexes may be calculated using Equation 1 below:

$$n1(p, n_b, n_v) := \sqrt{\frac{(1-p)\cdot n_v^4 + (1+p)\cdot n_v^2 \cdot n_b^2}{(1+p)\cdot n_v^2 + (1-p)\cdot n_b^2}} \quad \text{Equation 1}$$

$$n2(p, n_b, n_v) := p \cdot n_b + (1-p) \cdot n_v$$

wherein n1 and n2 are the effective refractive indexes of two materials having different refractive indexes (e.g., a refractive index of mesoporous material through control of volume ratio), p is porosity, $n_b$ is the refractive index of material having a higher refractive index among two materials having different refractive indexes (e.g., refractive index of $SiO_x$: about 1.45), and $n_v$ is the refractive index of material having a lower refractive index among two materials having different refractive indexes (e.g., refractive index of air: 1).

As such, n1 is calculated and used when two materials having different refractive indexes have a low difference in index, whereas n2 is calculated and used when two materials having different refractive indexes have a high difference in index (Thin Solid Films 47, 219-222, 1977; Thin Solid Films 57, 172-178, 1979; and Optics Letters, vol. 30, no. 14, 2005).

The mesoporous material, which constitutes the optical film according to the example embodiments, may be selected from the group consisting of $TiO_2$, $ZrO_2$, $Al_2O_3$, $Nb_2O_5$, $Ta_2O_5$, $SiO_2$, $WO_3$, $HfO_2$ and $SnO_2$, but is not limited thereto.

The mesoporous material may be selected from the group consisting of SBA-2, SBA-15, SBA-16, FSM-16, KSW-2, MSU-S, MSU-X, HYPER Y, USY zeolite, faujasite, type L zeolite, mazzite, EMC-2, MAPO-36, AIP04-5, AIP04-8, VPI-5, zeolite A, zeolite X, zeolite Y, zeolite ZK-5, zeolite ZK-4, ZK-21, ZK-22, zeolite beta, ZSM-5, ZSM-11, ZSM-12, ZSM-38, ZSM-22, ZSM-23, ZSM-34, ZSM-35, ZSM-48, ZSM-58, MCM-1, MCM-2, MCM-3, MCM-4, MCM-5, MCM-9, MCM-10, MCM-14, MCM-22, MCM-41, MCM-48, MCM-49, MCM-56, AlPO-11, titanium aluminosilicate (TASO), TASO-45, boron silicate, titanium aluminophosphate (TAPO), and combinations thereof, but is not limited thereto.

The mesoporous material includes, depending on the pore arrangement structure, MCM-41, SBA-15, and MSU-H, having a hexagonal structure, and MCM-48, SBA-1, and SBA-16, having a cubic structure. Further, the above material is commercially available in the art, and is disclosed in USA patents below, the entire contents of which are herein incorporated by reference: zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), ZSM-5 (U.S. Pat. Nos. 3,702,886, 4,797,267 and 5,783,321), ZSM-11 (U.S. Pat. No. 3,709,979), ZSM-12 (U.S. Pat. No. 3,832,449), ZSM-12 and ZSM-38 (U.S. Pat. No. 3,948,758), zeolite ZSM-20 (U.S. Pat. No. 3,972,983), ZSM-35 (U.S. Pat. No. 4,016,245), ZSM-22 (U.S. Pat. No. 5,336,478), zeolite ZSM-23 (U.S. Pat. No. 4,076,842), ZSM-34 (U.S. Pat. No. 4,086,186), ZSM-35 (U.S. Pat. No. 4,016,245), ZSM-48 (U.S. Pat. No. 4,397,827), ZSM-58 (U.S. Pat. No. 4,698,217), zeolite beta (U.S. Pat. No. 3,308,069), MCM-1 (U.S. Pat. No. 4,639,358), MCM-2 (U.S. Pat. No. 4,673,559), MCM-3 (U.S. Pat. No. 4,632,811), MCM-4 (U.S. Pat. No. 4,664,897), MCM-5 (U.S. Pat. No. 4,639,357), MCM-9 (U.S. Pat. No. 4,880,611), MCM-10 (U.S. Pat. No. 4,623,527), MCM-14 (U.S. Pat. No. 4,619,818), MCM-22 (U.S. Pat. No. 4,954,325), MCM-41 (U.S. Pat. No. 5,098,684), M-41S (U.S. Pat. No. 5,102,643), MCM-48 (U.S. Pat. No. 5,198,203), MCM-49 (U.S. Pat. No. 5,236,575), MCM-56 (U.S. Pat. No. 5,362,697), AlPO-11 (U.S. Pat. No. 4,310,440), titanium aluminosilicate (TASO), TASO-45 (EP-A-0 229,295), boron silicate (U.S. Pat. No. 4,254,297), titanium aluminophosphate (TAPO) (U.S. Pat. No. 4,500,651), a mixture of ZSM-5 and ZSM-11 (U.S. Pat. No. 4,229,424), ECR-18 (U.S. Pat. No. 5,278,345) and SAPO-11 (U.S. Pat. No. 4,440,871).

The filler, which is loaded in the pores of the mesoporous material, may be selected from the group consisting of silicon, a compound semiconductor material, and metal oxide, but is not limited thereto.

The compound semiconductor material may be selected from the group consisting of a Group II-VI compound semiconductor material, a Group III-V compound semiconductor material, a Group IV-VI compound semiconductor material, and mixtures thereof, but is not limited thereto.

The Group II-VI compound semiconductor material may be selected from the group consisting of a binary compound, including CdSe, CdTe, ZnS, ZnSe, and ZnTe; a ternary compound, including CdSeS, CdSeTe, CdSTe, ZnSeS, ZnSeTe, ZnSTe, CdZnS, CdZnSe, and CdZnTe; and a quaternary compound, including CdZnSeS, CdZnSeTe, CdZnSTe, CdHgSeS, CdHgSeTe, CdHgSTe, HgZnSeS, HgZnSeTe, and HgZnSTe, but is not limited thereto.

The Group III-V compound semiconductor material may be selected from the group consisting of a binary compound, including GaN, GaP, GaAs, GaSb, InP, InAs, and InSb; a ternary compound, including GaNP, GaNAs, GaNSb, GaPAs, GaPSb, InNP, InNAs, InNSb, InPAs, InPSb, and GaAlNP; and a quaternary compound, including GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, and InAlPSb, but is not limited thereto.

The Group IV-VI compound semiconductor material may be selected from the group consisting of a binary compound, including PbS, PbSe, and PbTe; a ternary compound, including PbSeS, PbSeTe, PbSTe, SnPbS, SnPbSe, and SnPbTe; and a quaternary compound, including SnPbSSe, SnPbSeTe, and SnPbSTe, but is not limited thereto.

The metal oxide as the filler of the optical film may be selected from the group consisting of $TiO_2$, ZnO, $SiO_2$, $SnO_2$, $WO_3$, $ZrO_2$, $HfO_2$, $Ta_2O_5$, $BaTiO_3$, $BaZrO_3$, $Al_2O_3$, $Y_2O_3$ and $ZrSiO_4$, but is not limited thereto. In the case where metal oxide nanowires are grown in the pores of the mesoporous material, the types of the mesoporous material and the filler in the pores thereof should be different from each other. This is intended to realize a desired magnitude of effective refractive index through the control of the volume ratio of mesoporous material to filler.

The optical film according to the example embodiments may be applied to the development of various optical devices, including display devices having improved display quality, optical lenses using antireflective coatings to improve the efficiency of a next-generation optical recording apparatus, solar cells using antireflective coatings to decrease interfacial reflections from surfaces thereof, and optical parts including lenses having a small curvature radius or having a non-spherical surface.

In addition, according to the example embodiments, a method of manufacturing an optical film may include (a) providing a mesoporous material having a plurality of pores of a uniform size; and (b) subjecting the mesoporous material to thin film treatment, thus forming a monolayered antireflection film.

The method may further include (c) stacking the monolayered antireflection film with one or more other monolayered antireflection films having refractive indexes different from the refractive index of the monolayered antireflection film.

The method may further include (d) filling the pores of the mesoporous material having a plurality of pores of a uniform size with a filler having a refractive index different from that of the mesoporous material, after (a).

As such, (d) may be conducted by (e) incorporating metal catalyst particles into the pores of the mesoporous material and (f) three-dimensionally distributing the mesoporous material having the metal catalyst particles to thus grow nanowires.

The method of manufacturing the optical film according to the example embodiments is stepwisely described in detail below.

(a) Provision of Mesoporous Material Having Plurality of Pores of Uniform Size

Figure 8:
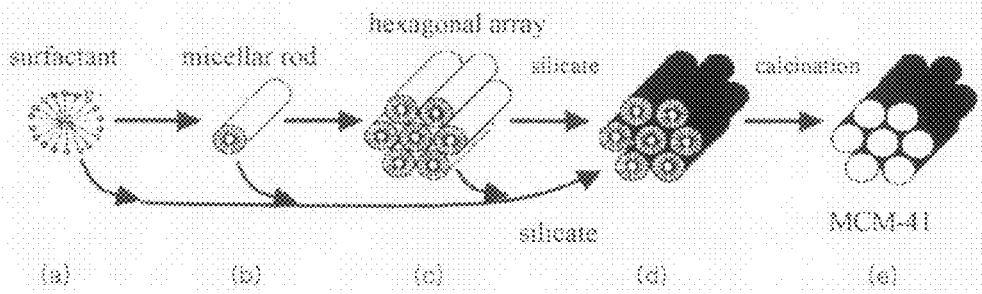

FIG. 8 is a schematic view illustrating the process of synthesizing the mesoporous material which is used to manufacture the optical film, according to the example embodiments.

With reference to FIG. 8, deionized water is added with a surfactant having a hydrophilic head portion and a hydrophobic tail portion and an acid for pH control and is then stirred, thus forming surfactant micelles through self-assembly (a of FIG. 8).

Thereafter, when the aqueous solution is stirred at room temperature for a predetermined period of time, the micelles are assembled to each other to thus form a micellar rod shape (b of FIG. 8), and are then further assembled, thus forming hexagonal supramolecules (c of FIG. 8).

The surfactant may be selected from the group consisting of poly(ethylene oxide)-poly(propylene oxide)-poly(ethylene oxide) ($EO_m$-$PO_n$-$EO_m$). Preferably, $EO_{20}$-$PO_{70}$-$EO_{20}$ is used.

The aqueous solution has a pH ranging from −1 to 3, and preferably from 0 to 1.

Thereafter, the aqueous solution containing the supramolecules is added with an inorganic material such as silicate, slowly stirred, and then subjected to hydrothermal treatment in an autoclave, so that the hydrophilic head portion of the surfactant, which is present on the surface of the aqueous solution, interacts with the inorganic material, thus forming a composite mesoporous material (d of FIG. 8).

The inorganic material may be selected from the group consisting of materials including silicate. Preferably useful is TEOS (Tetra-Ethyl-Ortho-Silicate).

Subsequently, the composite mesoporous material in the aqueous solution is filtered, washed and then burned, to thus eliminate the surfactant, thereby obtaining the mesoporous material useful in the example embodiments (e of FIG. 8).

The mesoporous material thus synthesized is characterized in that the pores thereof have a uniform diameter.

The porous material allowing the flow of fluid may be classified into, depending on the pore size of the material, micropores having pore sizes less than 2 nm, mesopores having pore sizes ranging from 2 nm to 50 nm, and macropores having pore sizes greater than 50 nm. In the optical film according to the example embodiments, the use of mesopores is preferable.

In the case of the mesoporous material, it has a large pore size so that the fluid may freely flow, and the surface area of the material coming into contact with the fluid is relatively large. As such, the variation in the diameter of the pores in the mesoporous material may be maintained within ±0.15 nm.

The pore size and structure of the mesoporous material according to the example embodiments may be freely changed. Specifically, the pore size of the mesoporous material may be changed in the course of hydrothermal treatment, depending on the temperature and time. In the mesoporous material, the pore size is increased as the temperature inside the autoclave is higher and the treatment time is longer. Further, the structure of the mesoporous material is determined by the type of polymer, which is a matrix thereof. Even if the same type of polymer is used, the mesoporous material may have variable structures depending on the molar ratio of the solution.

Figure 9:
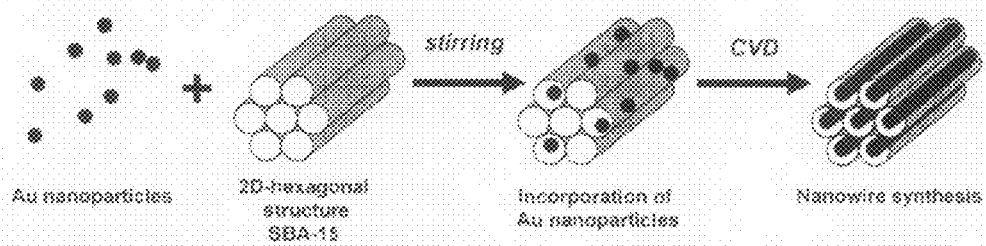
Figure 10:
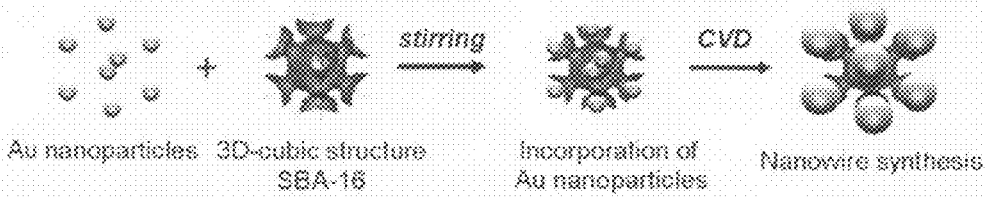

As mentioned above, the mesoporous material may be synthesized to have various structures, for example, a hexagonal structure (e.g., SBA-15), as seen in FIG. 9, or a cubic structure (e.g., SBA-16), as seen in FIG. 10.

(b) Formation of Monolayered Antireflection Film Through Thin Film Treatment of Mesoporous Material A coating solution including the mesoporous material is applied on a substrate, burned, and then dried, thus forming a thin film of mesoporous material, but the example embodiments are not limited to the above process.

(c) Stacking of Monolayered Antireflection Film with One or More Other Monolayered Antireflection Films Having Refractive Indexes Different from Refractive Index of Monolayered Antireflection Film The process of stacking the monolayered antireflection film with one or more other monolayered antireflection films having refractive indexes different from the refractive index of the monolayered antireflection film may be performed through printing, spraying, spin coating, dipping, LB (Langumuir Blodgett), or inkjetting. The optical film thus formed may be provided in the form of a thin film without the use of expensive thickness control equipment and vacuum equipment.

(d) Filling of Pores of Mesoporous Material Having Plurality of Pores of Uniform Size with Filler Having Refractive Index Different from Mesoporous Material According to the example embodiments, the method may further include (d), after (a), and (d) may be performed by (e) and (f) below.

(e) Incorporation of Metal Catalyst Particles into Pores of Mesoporous Material

The incorporation of the metal catalyst particles into the pores of the mesoporous material may be performed by preparing a mixture solution including a metal salt, deionized water and a solvent, adding a mesoporous material thereto, and then subjecting the obtained mixture solution to sonication at room temperature, thus forming the metal catalyst particles in the pores of the mesoporous material.

Whether or not the metal catalyst particles are formed may be confirmed by observing the change in the color of the aqueous solution. For example, in the case where the metal salt is potassium tetrachloroaurate ($KAuCl_4$), the color of the aqueous solution is changed from yellow to purple in the presence of the Au nanoparticles. Subsequently, the mesoporous material having the metal catalyst particles is filtered, dried in an oven, and then burned, thus completely removing the organic material.

In the method of manufacturing the optical film according to the example embodiments, the metal salt may be selected from among $KAuCl_4$ and $HAuCl_4$. Preferably used is $HAuCl_4$.

Alternatively, the incorporation of the metal catalyst particles into the pores of the mesoporous material may be performed by subjecting the mesoporous material to functionalization with APTES (Amino-Propyl-Tri-Ethoxy-Silane), having an amine group using a reflux, and then to mixing with potassium tetrachloroaurate ($KAuCl_4$), thereby incorporating the metal catalyst particles. As such, in order to eliminate undesirable external metal catalyst particles, it is preferred that an $NaBH_4$ solution acting as a reducing agent be added to thus reduce the metal catalyst particles.

(f) Growth of Nanowires in Pores of Mesoporous Material

According to the example embodiments, the method may further include (f), after (a) and (e).

The optical film according to the example embodiments may be manufactured by growing nanowires through chemical vapor deposition (CVD) using a vapor-liquid-solid (VLS) mechanism.

Figure 11:
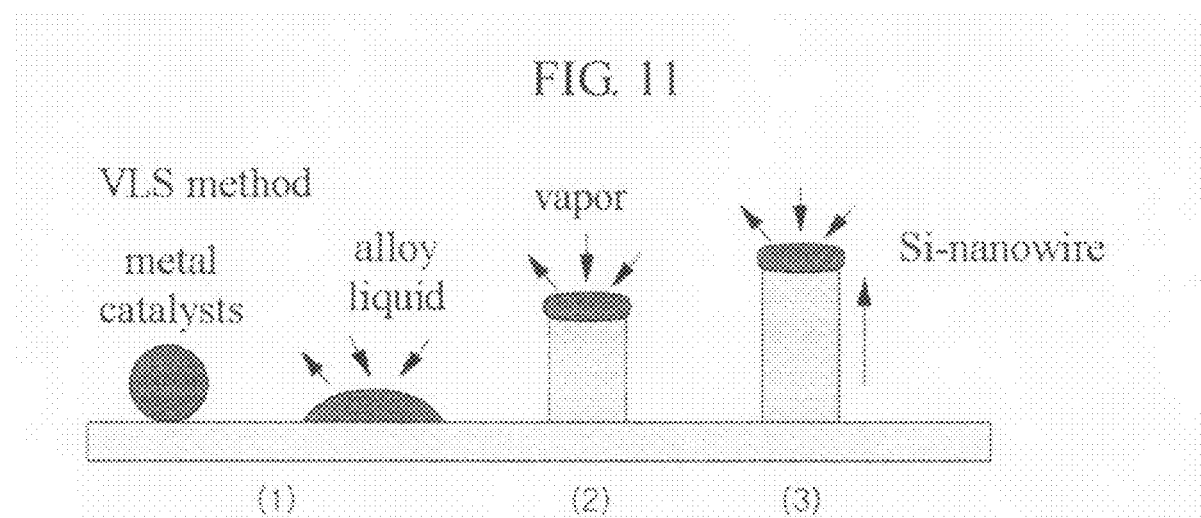

As seen in FIG. 11, the VLS process is performed by condensing a nanowire precursor, which is transferred in a hot furnace, on the surface of a melt catalyst, including gold, cobalt or nickel, to thus crystallize it, thereby growing nanowires.

According to the VLS process, the mesoporous material in a powder form obtained in (e) is loaded into a furnace in a state of being placed in a boat or a crucible, and is then heated while a carrier gas and a nanowire precursor are supplied, thus forming the nanowires.

Figure 12:
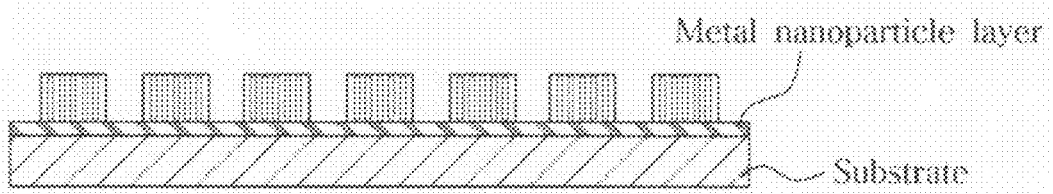
Figure 12:
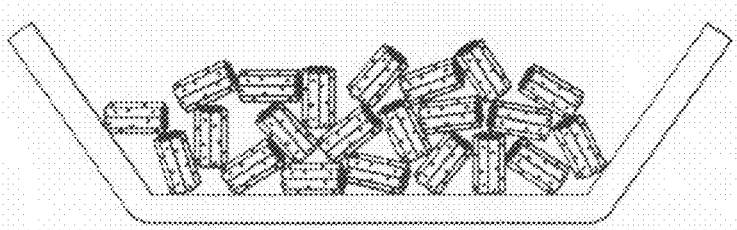

As seen in FIG. 12, the mesoporous material having the metal catalyst particles according to the example embodiments has a three-dimensional distribution (3D distribution), instead of the two-dimensional distribution (2D distribution) characteristic of mesoporous material having metal catalyst particles on a substrate according to conventional techniques. Thereby, it is possible to synthesize nanowires on a large scale.

The carrier gas used in the VLS process may be selected from the group consisting of Ar, $N_2$, He, and $H_2$, but is not limited thereto. The carrier gas may be supplied at about 100 sccm, which may be changed depending on the process.

The VLS process may be performed at 370-800° C. under pressure of 760 torr. Further, the heating time may be adjusted depending on the length of nanowires.

In the VLS process, in the case of silicon nanowires, a nanowire precursor, including $SiH_4$, $SiCl_4$ or $SiH_2Cl_2$, may be used, but the example embodiments are not limited thereto.

In the case of nanowires composed of compound semiconductor material, an organic metal gas is used as the nanowire precursor, and may be selected from the group consisting of trimethylgallium (TMG), arsine gas ($AsH_3$), trimethylindium (TMI), $PH_3$ and trimethylaluminum, but is not limited thereto. In particular, in order to grow GaAs, which is a Group III-V compound semiconductor material, to nanowires, a precursor, including trimethylgallium (TMG), trimethylindium (TMI), or $PH_3$, may be used.

A better understanding of the example embodiments, in regard to the method of growing the nanowires in the pores of the mesoporous material, may be obtained through the following examples which are set forth to illustrate, but are not to be construed as the limit of the example embodiments.

EXAMPLE

Growth of Nanowires in Pores of Mesoporous Material (i) Synthesis of Mesoporous Material 4 g of P123 ($EO_{20}$-$PO_{70}$-$EO_{20}$), 30 g of deionized water, and 120 g of 2.0 M HCl were added and then stirred at room temperature for 4 hours. The obtained solution was heated at 35° C. in a boiling water bath, slowly added with 8.5 g of TEOS (Tetra-Ethyl-Ortho-Silicate), and then stirred at 35° C. for 20 hours.

Subsequently, the solution was subjected to hydrothermal treatment in an autoclave at 80° C. for 24 hours without stirring. The solution was filtered with deionized water to thus obtain a composite mesoporous material, which was then subjected to slurry treatment using an ethanol-hydrochloric acid aqueous solution for 30 min. The obtained slurry was filtered, washed with ethanol, and then dried in an oven at 80° C. for 4 hours.

Subsequently, the dried product was burned at 550° C. for 6 hours, thus completely removing the organic material from the mesoporous material.

Figure 13A:
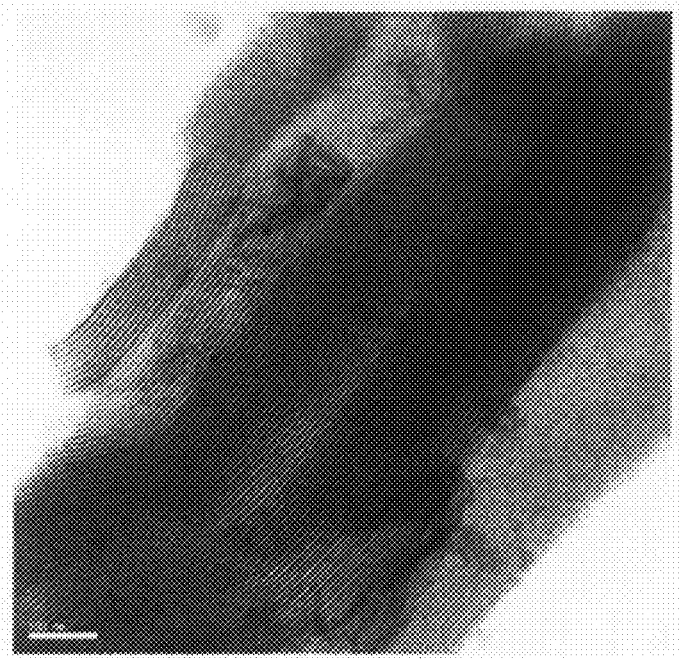
FIG. 13A is a TEM (Transmission Electron Microscope) image of the mesoporous material, according to the example embodiments.
Figure 13A:
Figure 13A:
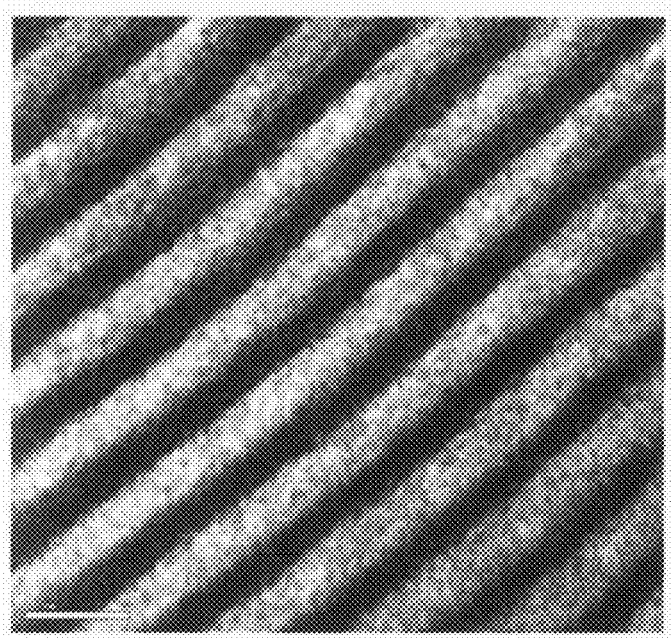
Figure 13B:
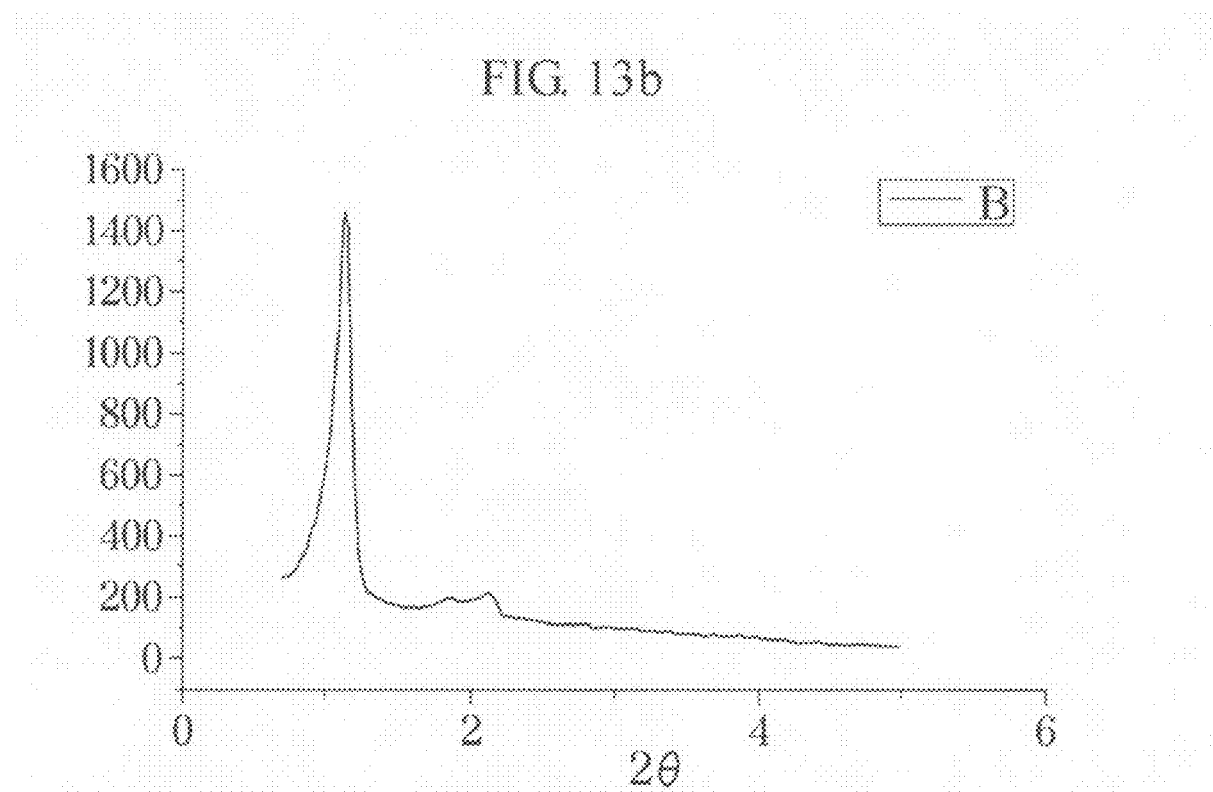
FIG. 13B is an XRD (X-Ray Diffraction) graph of the mesoporous material, according to the example embodiments.

The TEM image and the XRD graph of the mesoporous material thus obtained are shown in FIGS. 13A and 13B.

(ii) Incorporation of Metal Catalyst Particles into Pores of Mesoporous Material 25 ml of 0.005 M potassium tetrachloroaurate ($KAuCl_4$), 75 ml of deionized water, and 100 ml of ethanol were mixed, the mesoporous material obtained in (i) was added thereto, and then the obtained mixture solution was subjected to sonication at room temperature for 3 hours, thus forming metal catalyst particles.

Subsequently, the solution was filtered to thus separate the metal catalyst particles, after which the separated metal catalyst particles were washed with deionized water and ethanol and then dried in an oven at 100° C. for 4 hours.

Thereafter, the dried product was burned at 500° C. for 6 hours, thus completely removing the organic material from the metal catalyst particles.

Figure 14A:
FIG. 14A is a TEM image of the mesoporous material, in which metal catalyst nanoparticles are incorporated into the pores thereof, according to the example embodiments.
Figure 14B:
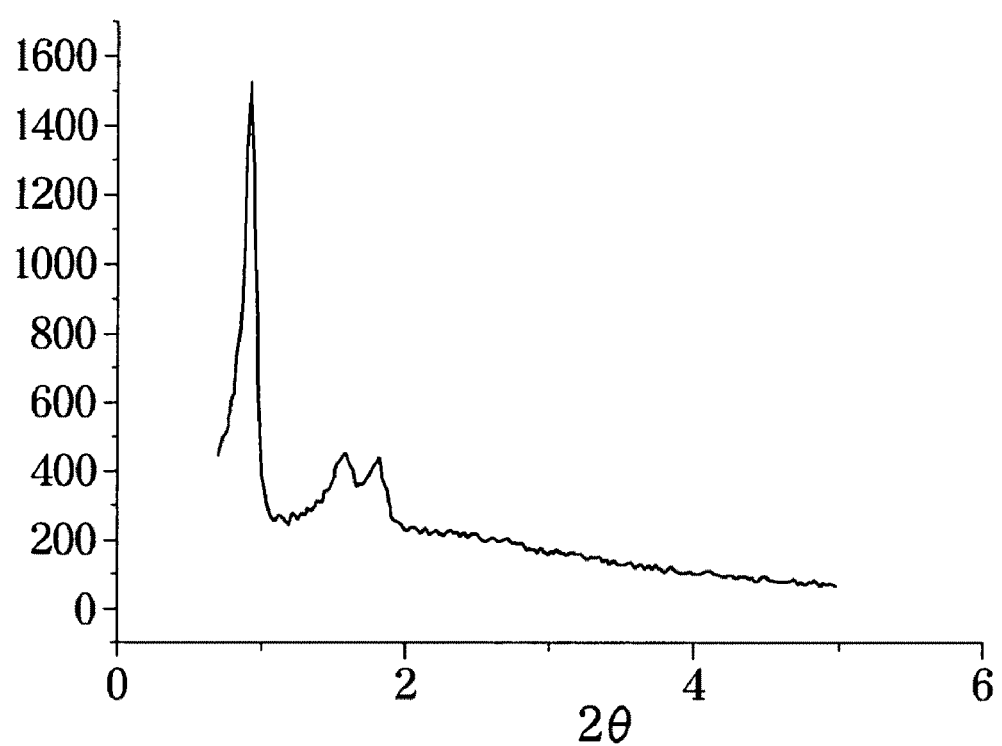
FIG. 14B is an XRD graph of the mesoporous material, in which metal catalyst nanoparticles are incorporated into the pores thereof, according to the example embodiments.

The TEM image of the mesoporous material having the metal catalyst particles incorporated into the pores thereof is shown in FIG. 14A, and the XRD graph of the mesoporous material having the metal catalyst particles is shown in FIG. 14B.

(iii) Growth of Nanowires

Subsequently, 0.05 mg of powder of the mesoporous material having the metal catalyst particles was loaded in a furnace in a state of being placed in a small vial covered with quartz wool, and was then heated at a rate of 10~15° C. per min while argon (Ar) was supplied at about 100 sccm and a structure source, for example, $SiH_4$, was supplied at about 20 sccm. The process pressure was maintained at 3 torr.

When the process temperature reached 460° C., it was maintained at that temperature for 30 min to thus grow silicon nanowires. Subsequently, the temperature was slowly decreased to room temperature, thus completing the growth of the silicon nanowires.

Figure 15:
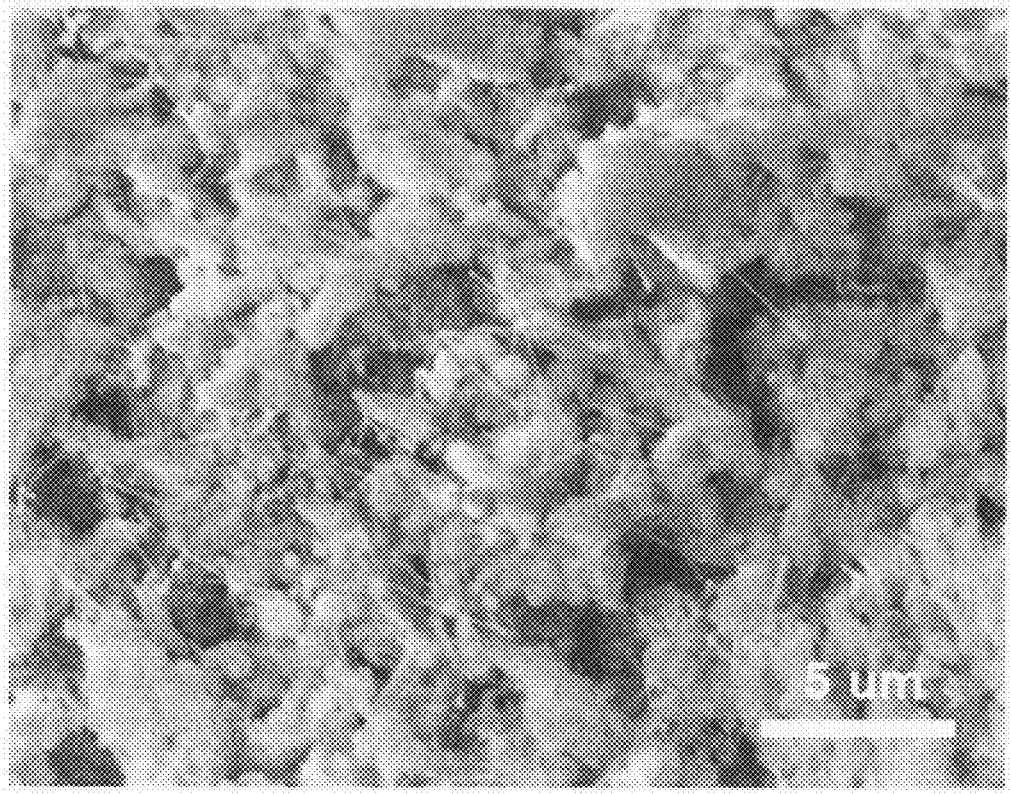

The TEM image of the mesoporous material having the grown silicon nanowires is shown in FIG. 15.

Figure 16:
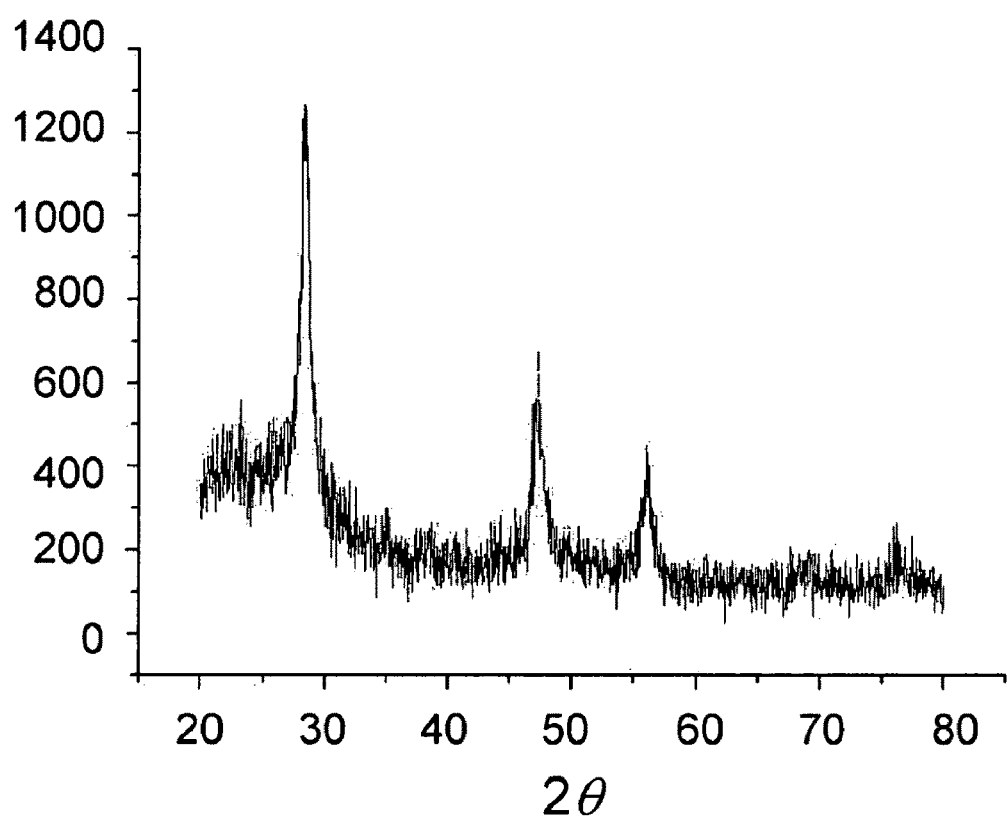

Further, the XRD graph of the mesoporous material having the grown silicon nanowires is shown in FIG. 16.

As described hereinbefore, the example embodiments provide an optical film having a graded refractive index and a method of manufacturing the same. According to the example embodiments, the optical film having a graded refractive index includes one or more antireflection films composed of a mesoporous material. The porosity of the mesoporous material is adjusted, and thereby the volume ratio of mesoporous material to air or filler in the pores thereof is controlled, therefore obtaining a desired magnitude of effective refractive index. In the case where the optical film includes two or more antireflection films which are sequentially stacked, it has a refractive index distribution in which the refractive indexes sequentially change at the interface of a device. Hence, the optical film may ensure predetermined antireflection performance even under conditions in which the ranges of incident wavelengths and incident angles are broad, making it easy to realize a large area.

The method of manufacturing the optical film having a graded refractive index according to the example embodiments obviates the need for expensive thickness control equipment and vacuum equipment, and enables the formation of a thin film having a small thickness. As well, the process of filling the pores of the mesoporous material with filler may be conducted using a nanowire growing technique, advantageously realizing mass production.

Further, the optical film according to the example embodiments may be applied to the development of various optical devices, including display devices having improved display quality, optical lenses using antireflective coatings to improve the efficiency of a next-generation optical recording apparatus, solar cells using antireflective coatings to decrease interfacial reflections from surfaces thereof, and optical parts including lenses having a small curvature radius or having a non-spherical surface.

Although preferred example embodiments have been disclosed for illustrative purposes, those skilled in the art will appreciate that various modifications, additions and substitutions are possible, without departing from the scope and spirit of the accompanying claims.

What is claimed is:

1. An optical film, comprising a first antireflection film composed of a first mesoporous material, and a second antireflection film on a surface of the first antireflection film and composed of a second mesoporous material, the first and second mesoporous materials each having a plurality of pores of a uniform size, the pores of the first mesoporous material being filled with air or a first filler having a refractive index different from that of the first mesoporous material, and the pores of the second mesoporous material being filled with air or a second filler having a refractive index different from that of the mesoporous material, wherein the first and second antireflection films are sequentially stacked, and the first and second antireflection films have refractive indexes that sequentially decrease.

2. The optical film as set forth in claim 1, wherein the optical film has an effective refractive index which is controlled by adjusting the number of pores in each of the first and second mesoporous materials.

3. The optical film as set forth in claim 1, wherein the optical film has a reflectance ranging from about 0:01% to about 1% in a visible light range.

4. The optical film as set forth in claim 1, wherein the first and second mesoporous materials are independently selected from the group consisting of $TiO_2$, $ZrO_2$, $Al_2O_3$, $Nb_2O_5$, $Ta_2O_5$, $SiO_2$, $WO_3$, $HfO_2$ and $SnO_2$.

5. The optical film as set forth in claim 1, wherein the first and second filler are independently selected from the group consisting of silicon, a compound semiconductor material, and metal oxide.

6. The optical film as set forth in claim 5, wherein the compound semiconductor material is selected from a group consisting of a Group II-VI compound semiconductor material, a Group III-V compound semiconductor material, a Group IV-VI compound semiconductor material, and mixtures thereof.

7. An electronic device, comprising the optical film of claim 1.

8. The electronic device as set forth in claim 7, wherein the electronic device is selected from a group consisting of a display device, an optical lens, a solar cell, and an optical device.

9. The optical film of claim 1, further comprising a third antireflection film, composed of a third mesoporous material and disposed on a surface of the second antireflection film, the third mesoporous material having a plurality of pores of a uniform size, and the pores of the third mesoporous material being filled with air or a third filler having a refractive index different from that of the third mesoporous material, wherein the third antireflection film is further sequentially stacked on the first and second antireflection films, and the first, second, and third antireflection films have refractive indexes that sequentially decrease.

* * * * *